United States Patent
Komano et al.

(10) Patent No.: US 9,998,476 B2
(45) Date of Patent: Jun. 12, 2018

(54) DATA DISTRIBUTION APPARATUS, COMMUNICATION SYSTEM, MOVING OBJECT, AND DATA DISTRIBUTION METHOD

(71) Applicant: Kabushiki Kaisha Toshiba, Minato-ku (JP)

(72) Inventors: Yuichi Komano, Yokohama (JP); Takeshi Kawabata, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 134 days.

(21) Appl. No.: 15/263,837

(22) Filed: Sep. 13, 2016

(65) Prior Publication Data
US 2017/0142123 A1    May 18, 2017

(30) Foreign Application Priority Data
Nov. 13, 2015    (JP) .................................. 2015-223082

(51) Int. Cl.
*H04L 29/06*    (2006.01)
*H04L 29/08*    (2006.01)
*H04L 9/08*     (2006.01)

(52) U.S. Cl.
CPC .......... *H04L 63/104* (2013.01); *H04L 9/0822* (2013.01); *H04L 67/12* (2013.01)

(58) Field of Classification Search
CPC ...... H04L 63/104; H04L 67/12; H04L 9/0822
See application file for complete search history.

(56) References Cited

U.S. PATENT DOCUMENTS

| 7,602,915 B2 | 10/2009 | Iwamura | |
| 2006/0168657 A1* | 7/2006 | Baentsch | H04L 29/06 726/21 |
| 2008/0226076 A1* | 9/2008 | Baentsch | H04L 29/06 380/270 |
| 2008/0232595 A1* | 9/2008 | Pietrowicz | G06Q 20/3829 380/277 |

(Continued)

FOREIGN PATENT DOCUMENTS

| JP | 2005-203882 A | 7/2005 |
| JP | 2005-341528 A | 12/2005 |

(Continued)

*Primary Examiner* — Amir Mehrmanesh
(74) *Attorney, Agent, or Firm* — Oblon, McClelland, Maier & Neustadt, L.L.P.

(57) ABSTRACT

According to an embodiment, a data distribution apparatus is connected with electronic apparatuses through a network. The data distribution apparatus includes a storage, a transmitter, a receiver, and an output unit. The storage is configured to store management information in which predetermined data is associated with number specification information for specifying number of electronic apparatuses belonging to the group. The transmitter is configured to transmit a sharing start instruction including the predetermined data. The receiver is configured to receive one or more distribution requests transmitted from one or more electronic apparatuses in response to the instruction. The output unit is configured to output an error signal indicating that an unauthorized electronic apparatus is connected when the number of received distribution requests exceeds the number specified.

21 Claims, 6 Drawing Sheets

(56) References Cited

U.S. PATENT DOCUMENTS

2012/0331088 A1\* 12/2012 O'Hare ............... G06F 21/6227
709/214
2016/0056953 A1 2/2016 Komano et al.
2016/0211974 A1 7/2016 Komano et al.

FOREIGN PATENT DOCUMENTS

| JP | 2011-234092 A | 11/2011 |
| JP | 2013-225875 A | 10/2013 |
| JP | 5772692 B2 | 7/2015 |
| JP | 2016-46719 A | 4/2016 |
| JP | 2016-134671 A | 7/2016 |

\* cited by examiner

| GROUP | PREDETERMINED DATA | NUMBER SPECIFICATION INFORMATION |
|---|---|---|
| FIRST GROUP | FIRST CONTROL SIGNAL | ECU_1, ECU_2, ECU_4 |
| SECOND GROUP | SECOND CONTROL SIGNAL | ECU_1, ECU_3 |
| ⋮ | ⋮ | ⋮ |

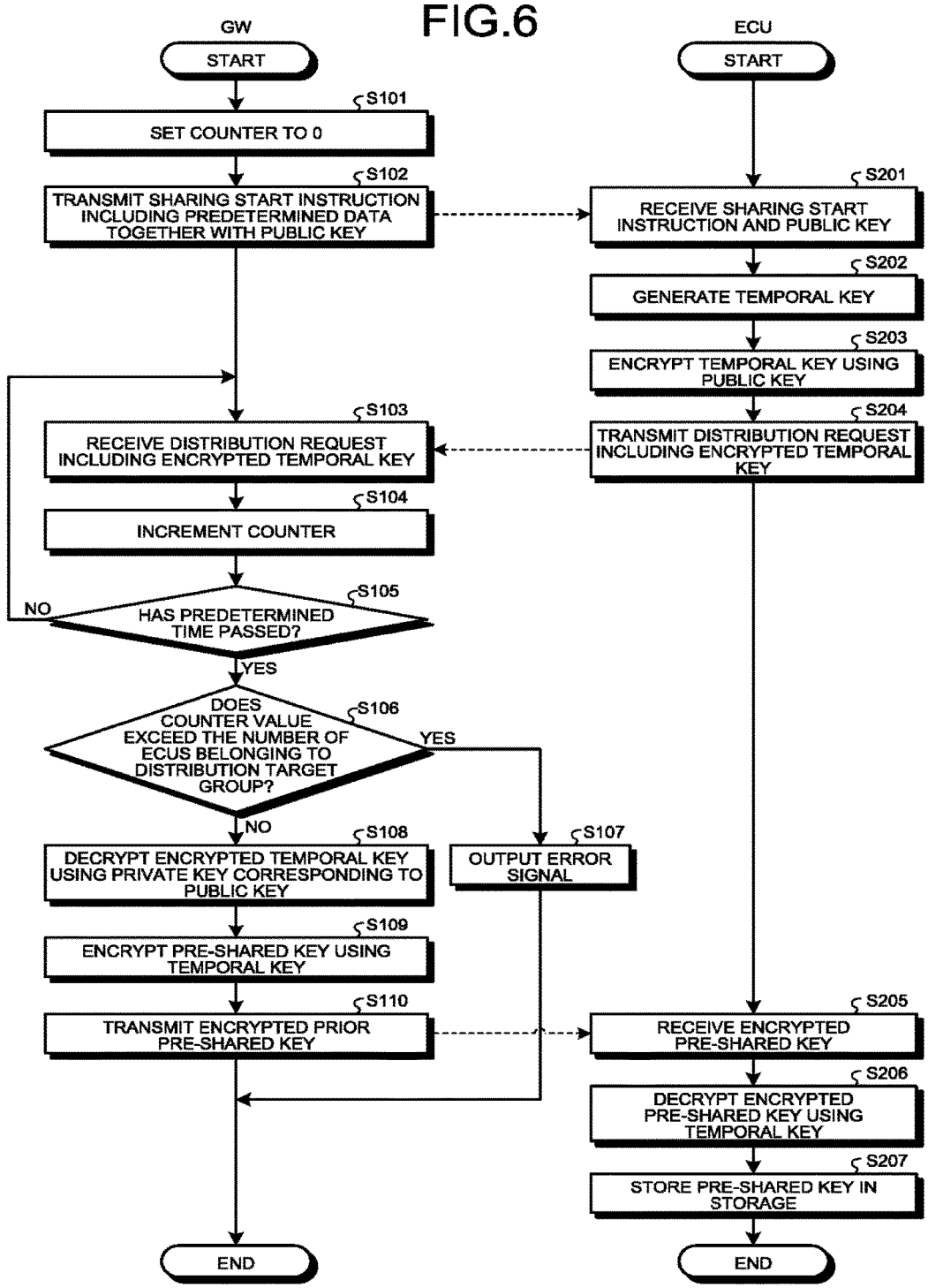

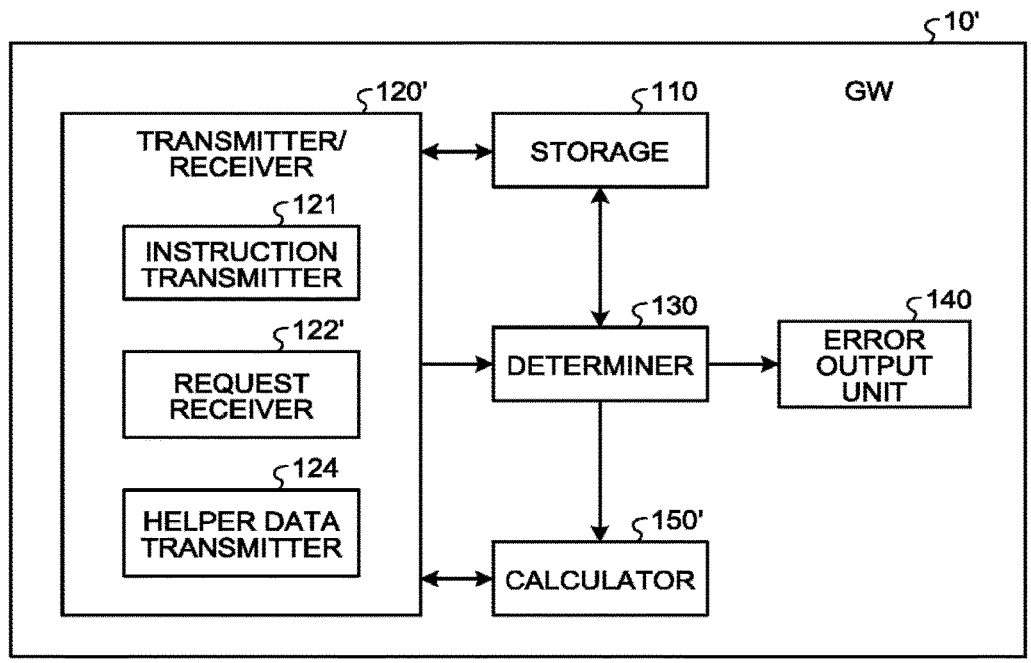
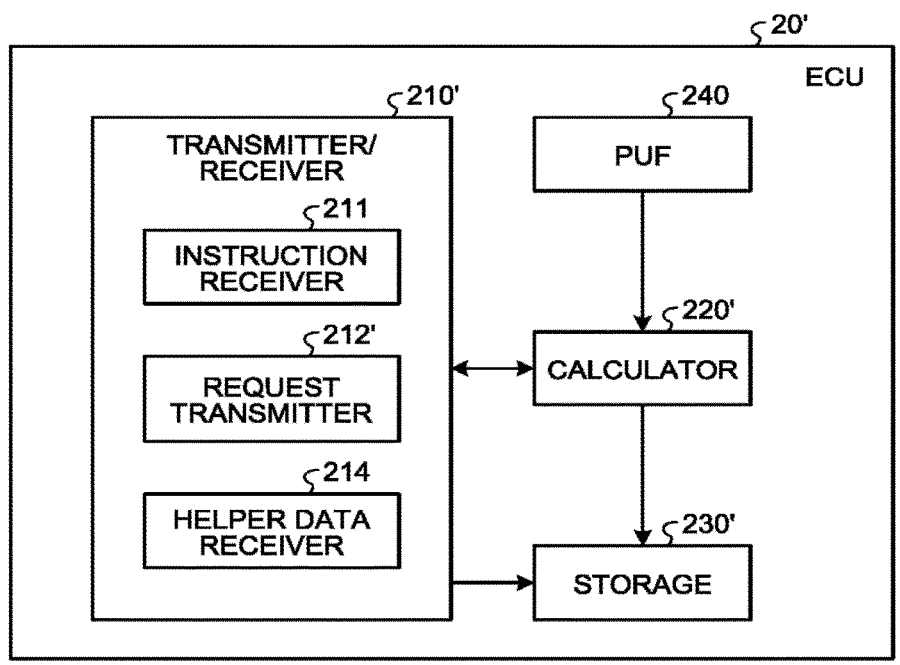

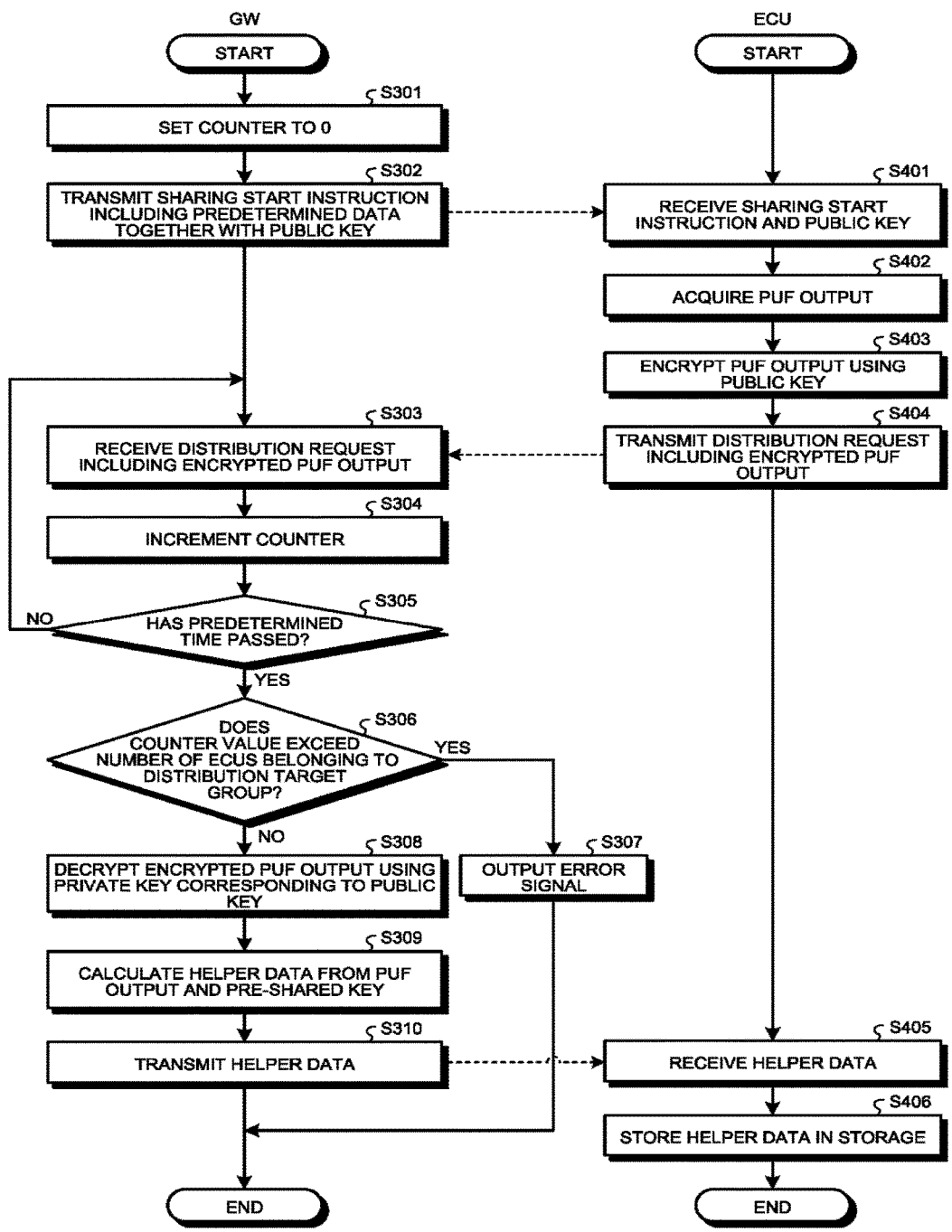

DATA DISTRIBUTION APPARATUS, COMMUNICATION SYSTEM, MOVING OBJECT, AND DATA DISTRIBUTION METHOD

CROSS-REFERENCE TO RELATED APPLICATION

This application is based upon and claims the benefit of priority from Japanese Patent Application No. 2015-223082, filed on Nov. 13, 2015; the entire contents of which are incorporated herein by reference.

FIELD

Embodiments described herein relate generally to a data distribution apparatus, a communication system, a moving object, and a data distribution method.

BACKGROUND

For example, moving objects such as automobiles are equipped with various electronic control units (ECUs) for controlling various types of devices. These ECUs are connected to, for example, a network such as a controller area network (CAN) to control the automobile while transmitting/receiving signals through the network.

In a network that electronic apparatuses such as ECUs are connected to, ensuring the validity of communication is extremely important in order to prevent wrong control. In order to ensure the validity of communication, the use of encryption techniques is effective. For example, if electronic apparatuses performing communication share data such as shared encryption keys correctly, this data can be used to authenticate communication, conceal contents of communication, and detect tampering. However, when another electronic device improperly acquires the data to be shared between the electronic apparatuses that perform communications, validity of communications cannot be guaranteed.

BRIEF DESCRIPTION OF THE DRAWINGS

FIG. 6 is a flowchart illustrating an example of processing procedures of the first embodiment;

FIG. 7 is a block diagram illustrating a functional configuration example of the GW according to a second embodiment;

FIG. 8 is a block diagram illustrating a functional configuration example of the ECU according to the second embodiment; and FIG. 9 is a flowchart illustrating an example of processing procedures of the second embodiment.

DETAILED DESCRIPTION

According to an embodiment, a data distribution apparatus is connected with a plurality of electronic apparatuses through a network. The data distribution apparatus includes a storage, an instruction transmitter, a request receiver, and an error output unit. The storage is configured to store group management information in which predetermined data corresponding to the group is associated with number specification information for specifying number of electronic apparatuses belonging to the group. The instruction transmitter is configured to transmit a sharing start instruction including the predetermined data. The request receiver is configured to receive one or more distribution requests transmitted from one or more electronic apparatuses in response to the sharing start instruction. The error output unit is configured to output an error signal indicating that an electronic apparatus transmitting an unauthorized distribution request is connected to the network when the number of received distribution requests exceeds the number specified by the number specification information.

A data distribution apparatus according to embodiments is applicable to, for example, an in-vehicle network system (communication system) mounted on a vehicle serving as an example of a moving object. The following explanation illustrates an example in which an in-vehicle gateway apparatus (hereinafter abbreviated to "GW") included in an in-vehicle network system is configured as a data distribution apparatus of the embodiments. However, the apparatus and the system to which the data distribution apparatus is applicable are not limited to the following example. The data distribution apparatus according to the embodiments is widely applicable to various communication systems that are required to guarantee validity of communications using data such as a cryptographic key shared between the transmission side and the reception side of communication.

First Embodiment

Figure 1:
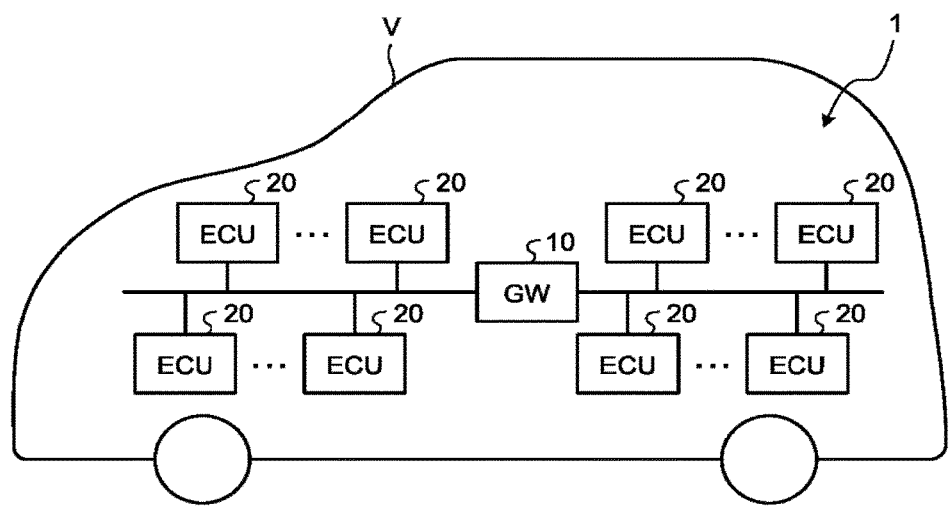
FIG. 1 is a schematic diagram illustrating an outline of an in-vehicle network system.

FIG. 1 is a schematic diagram illustrating an outline of an in-vehicle network system 1. As illustrated in FIG. 1, the in-vehicle network system 1 has a structure in which a GW 10 configured as a data distribution apparatus is connected with various ECUs 20 serving as electronic apparatuses mounted on a vehicle V via a network. The GW 10 according to the present embodiment has a function of distributing data such as a cryptographic key to be shared between the ECUs 20 that perform communications to each of the ECUs 20, in addition to original gateway functions such as relaying communications between subnetworks in the in-vehicle network system 1, and relaying communications between the in-vehicle network system 1 and a network outside the vehicle. The communication standard of the in-vehicle network system 1 may be a publicly known standard for in-vehicle networks, such as CAN and FlexRay (registered trademark).

When the ECUs 20 cooperate to control the vehicle V, the ECUs 20 perform communications via the network to transmit and receive a control signal. The term "control signal" herein is a general term for signals transmitted and received between the ECUs 20 to control the vehicle V. When a control signal is transmitted and received between the ECUs 20, validity of communications between the ECUs 20 should be guaranteed, to prevent incorrect control. Various methods exist to guarantee validity of communications, but real time property is required for communications between the ECUs 20 when the vehicle V is running, and thus much time cannot be taken to perform processing to guarantee validity of communications. For this reason, the present embodiment has a structure of using an authentication technique of message authentication code (MAC) that enables authentication of communication in a short time, to guarantee validity of communications between the ECUs 20.

The authentication technique of MAC uses a pre-shared key shared between the transmission side and the reception side or a session key derived from the pre-shared key, to derive a MAC value necessary for authentication. In the present embodiment, the GW 10 distributes, for example, a pre-shared key used for derivation of the MAC value to each of the ECUs 20 that perform communications.

The various ECUs 20 connected as nodes of the in-vehicle network system 1 to the network can be divided into groups according to the type of the control signal to be transmitted and received, such as a group of ECUs 20 that transmit or receive a control signal relating to the brake, and a group of ECUs 20 that transmit or receive a control signal relating to the vehicle speed. The group described herein is a conceptual classification in accordance with the type of a control signal to be transmitted and received. A control signal flowing on the network means that the ECUs 20 that belong to the group corresponding to the control signal transmit or receive the control signal, and the ECUs 20 that do not belong to the group neither transmit nor receive the control signal. When one ECU 20 transmits or receives a plurality of types of control signals, the ECU 20 may belong to a plurality of groups. A plurality of ECUs 20 that transmit or receive a plurality of types of control signals may be classified into one group.

The GW 10 according to the present embodiment performs distribution of a pre-shared key to each of the ECUs 20 on the network for each of the groups as described above. Specifically, the GW 10 activates the ECUs 20 that belong to a certain group, to cause each of the ECUs 20 to transmit a distribution request to the GW 10. Thereafter, in response to the distribution request, the GW 10 distributes a pre-shared key to be shared between the ECUs 20 that belong to the group. In the operation, when another ECU 20 that does not belong to the group or an electronic apparatus that is improperly connected to the network transmits an unauthenticated distribution request to the GW 10, the GW 10 may distribute a pre-shared key in response to the unauthenticated distribution request, and the authenticated ECUs 20 that belong to the group may not be able to properly share the pre-shared key. For this reason, the GW 10 according to the present embodiment is configured to compare the number of received distribution request with the number of ECUs 20 that belong to the group. When the number of received distribution requests exceeds the number of ECUs 20 that belong to the group, the GW 10 outputs an error signal indicating that an electronic apparatus that transmits an unauthenticated distribution request is connected to the network, to prompt the maintenance worker or the driver to properly cope with the situation.

Figure 2:
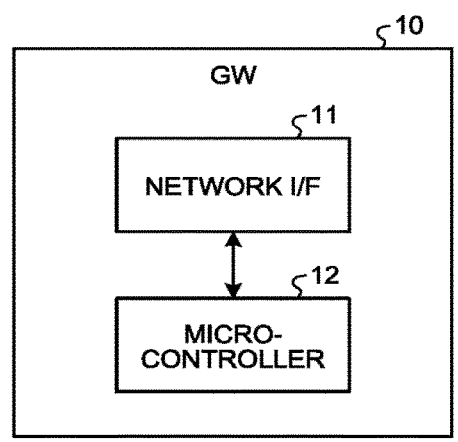
FIG. 2 is a block diagram illustrating a hardware configuration example of a GW.

FIG. 2 is a block diagram illustrating a hardware configuration example of the GW 10. For example, as illustrated in FIG. 2, the GW 10 includes a network I/F 11 and a microcontroller 12. The network I/F 11 is an interface connecting the GW 10 with the network. The microcontroller 12 has a structure in which a computer system is incorporated as an integrated circuit, to perform various controls in accordance with a program (software) operating on the computer system. The GW 10 achieves various functions relating to distribution of a pre-shared key, with the microcontroller 12 performing control in accordance with the program using the network I/F 11.

Figure 3:
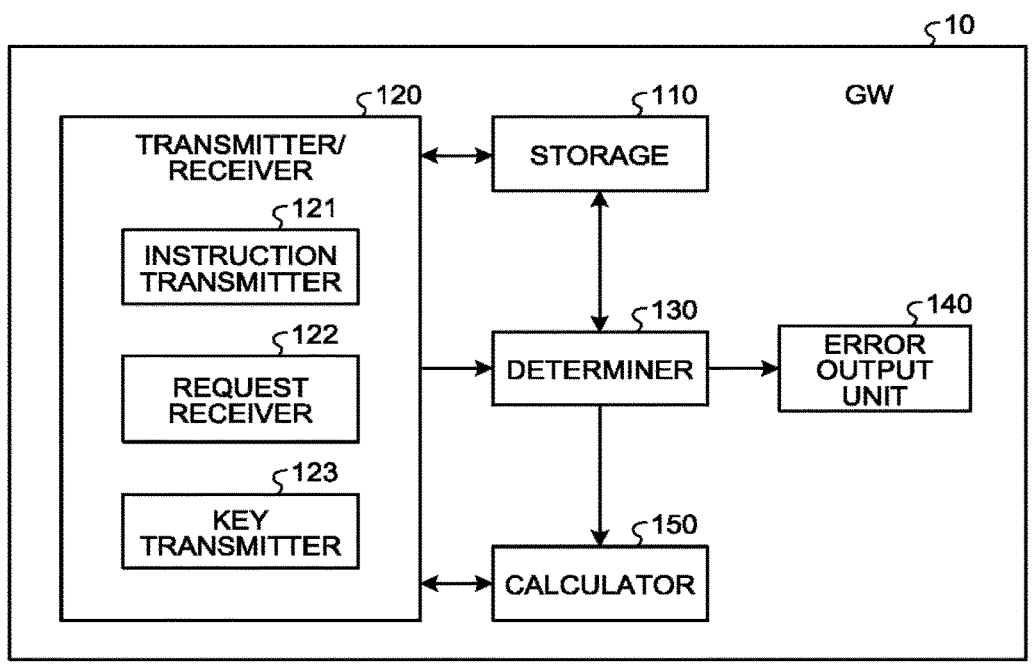
FIG. 3 is a block diagram illustrating a functional configuration example of the GW according to a first embodiment.

FIG. 3 is a block diagram illustrating a functional configuration example of the GW 10 according to the present embodiment. For example, as illustrated in FIG. 3, the GW 10 of the present embodiment includes a storage 110, a transmitter/receiver 120, a determiner 130, an error output unit 140, and a calculator 150, as functional constituent elements relating to distribution of a pre-shared key.

Figure 4:
FIG. 4 is a diagram illustrating an example of group management information.

The storage 110 stores therein group management information. The group management information is information associating predetermined data corresponding to the group with number specification information to specify the number of ECUs 20 belonging to the group, for each of the groups of the ECUs 20 described above. FIG. 4 is a diagram illustrating an example of the group management information stored in the storage 110. The group management information 30 in FIG. 4 illustrates an example of storing the control signal (such as a brake signal and a vehicle speed signal) to be transmitted or received by the ECUs 20 belonging to the group, as predetermined data corresponding to the group, and storing a set of apparatus IDs assigned to the respective ECUs 20 belonging to the group, as number specification information. Counting the number of apparatus IDs stored as the number specification information enables specification of the number of ECUs 20 belonging to the group.

The predetermined data corresponding to the group is not limited to the control signal described above, but may be any data enabling the ECU 20 to recognize that the group serving as a target of a sharing start instruction is the group that the ECU 20 itself belongs to, when the sharing start instruction including the predetermined data and described later is transmitted to the network. For example, a group ID assigned to the group may be used as the predetermined data. As another example, a set of apparatus IDs of the ECUs 20 belonging to the group may be used as the predetermined data. In this case, the predetermined data can be united with the number specification information. As another example, a combination of pieces of the data described above (such as a combination of a plurality of control signals, a combination of the control signal and the group ID, and a combination of the control signal and a set of apparatus IDs) may be used as the predetermined data.

The number specification information is not limited to a set of apparatus IDs described above, but may be any data enabling specification of the number of ECUs 20 belonging to the group. For example, the number itself of the ECUs 20 belonging to the group may be used as the number specification information.

The group management information may be stored in the storage 110, for example, when the GW 10 is manufactured or shipped, or stored in the storage 110 when the vehicle V equipped with the in-vehicle network system 1 including the GW 10 is manufactured or shipped. The group management information may also be acquired from outside of the GW 10 through an external input/output terminal of the GW 10 or the in-vehicle network system 1, to be stored in the storage 110. In the case of storing the group management information in the storage 110 after the vehicle V is shipped, the group management information may be updated to be compliant with change in network configuration in accordance with addition or removal of the ECUs 20.

The transmitter/receiver 120 is a module with which the GW 10 communicates with the ECUs 20 through the network. The transmitter/receiver 120 includes an instruction transmitter 121, a request receiver 122, and a key transmitter 123, as submodules.

The instruction transmitter 121 transmits a sharing start instruction including the predetermined data corresponding to the distribution target group to each of the ECUs 20 belonging to the group (hereinafter referred to as "distribution target group") to which the pre-shared key is distributed, together with a public key and a public key certificate of the GW 10. The instruction transmitter 121 does not separately transmit the sharing start instruction to each of the ECUs 20 belonging to the distribution target group, but broadcasts a sharing start instruction including the predetermined data corresponding to the distribution target group onto the network. Each of the ECUs 20 connected to the network receives the sharing start instruction, when the predetermined data included in the sharing start instruction transmitted from the instruction transmitter 121 of the GW 10 corresponds to the group to which the ECU 20 itself belongs.

The public key of the GW 10 is used for encrypting a temporal key described later in the ECU 20 that has received the sharing start instruction. The public key certificate is a certificate issued by the third party to guarantee the validity of the GW 10 transmitting the public key. The public key and the public key certificate of the GW 10 are stored in, for example, the storage 110, together with a private key corresponding to the public key. When each ECU 20 already holds the public key of the GW 10, such as the case where the public key of the GW 10 is published to the ECUs 20 in advance, the instruction transmitter 121 may transmit only the sharing start instruction including the predetermined data corresponding to the distribution target group, and may not transmit the public key or the public key certificate of the GW 10. In such a case, the GW 10 only have to store a private key corresponding to the public key.

The request receiver 122 receives a distribution request transmitted from each ECU 20 in response to the sharing start instruction transmitted from the instruction transmitter 121. The distribution request includes a temporal key encrypted using the public key of the GW 10. The temporal key itself encrypted using the public key of the GW 10 may be used as a distribution request. The temporal key is, for example, a random number generated at random in each ECU 20 that has received the sharing start instruction, to be used for encrypting the pre-shared key transmitted from the GW 10 to the ECU 20 in response to the distribution request. The encrypted temporal key included in the distribution request is decrypted using the private key corresponding to the public key of the GW 10.

The key transmitter 123 transmits a pre-shared key to be shared between the ECUs 20 belonging to the distribution target group to each of the ECUs that have transmitted the distribution request, when the determiner 130 described later determines that the number of distribution requests received by the request receiver 122 does not exceed the number specified by the number specification information corresponding to the distribution target group, that is, the number of ECUs 20 belonging to the distribution target group. Pre-shared keys may be, for example, fixed for respective groups in advance and stored in the storage 110. As another example, data selected at random or according to predetermined rules may be used as a pre-shared key when the pre-shared key is distributed.

The key transmitter 123 transmits the pre-shared keys encrypted using the respective temporal keys generated by the respective ECUs 20 to the respective ECUs 20 that have transmitted respective distribution requests. For example, the key transmitter 123 specifies an ECU 20 to which the pre-shared key is to be transmitted, from information of transmission source included in the distribution request received by the request receiver 122. The key transmitter 123 transmits the pre-shared key encrypted using the temporal key generated by the ECU 20 to the ECU 20 serving as a destination.

The key transmitter 123 may broadcast each of pre-shared keys encrypted using the respective temporal keys generated by the respective ECUs 20 onto the network. In such a case, the key transmitter 123 also transmits inspection data to inspect validity of the pre-shared key. The inspection data may be a hash value for the pre-shared key, or a value obtained by encrypting a predetermined value stored in both the GW 10 and the ECU 20 with the pre-shared key. In the case of using the hash value of the pre-shared key as inspection data, the ECU 20 is enabled to inspect validity of the pre-shared key, by calculating the hash value of the pre-shared key decrypted using the temporal key of the ECU 20 itself, and determining whether the calculated hash value agrees with the hash value transmitted from the GW 10. In the case of using the value obtained by encrypting the predetermined value using the pre-shared key as inspection data, the ECU 20 is enabled to inspect validity of the pre-shared key, by encrypting the predetermined value using the pre-shared key decrypted using the temporal key of the ECU 20 itself, and determining whether the obtained value agrees with the value transmitted from the GW 10.

The determiner 130 determines whether the number of distribution requests received by the request receiver 122 exceeds the number specified by the number specification information corresponding to the distribution target group, that is, the number of ECUs 20 belonging to the distribution target group. Specifically, the determiner 130 counts the number of distribution requests received by the request receiver 122, for example, with a counter whose value is temporarily stored in the storage 110. Specifically, when distribution of the pre-shared key is performed, first, the determiner 130 sets the counter value held in the storage 110 to 0, and increments (+1) the counter value whenever the request receiver 122 receives a distribution request. Thereafter, for example, when a predetermined time has passed since the instruction transmitter 121 transmitted the sharing start instruction, the determiner 130 refers to the counter value held in the storage 110, and compares the counter value with the number specified by the number specification information corresponding to the distribution target group, to determine whether the number of distribution requests received by the request receiver 122 exceeds the number of ECUs 20 belonging to the distribution target group.

When an unauthenticated distribution request is transmitted from an ECU 20 that does not belong to the distribution target group or an electronic apparatus that is improperly connected to the network, determination by the determiner 130 is performed to detect the unauthenticated distribution request. Specifically, when the number of distribution requests received by the request receiver 122 exceeds the number of ECU 20 belonging to the distribution target group, it can be determined that an unauthenticated distribution request is included in the distribution requests received by the request receiver 122.

The error output unit 140 outputs an error signal indicating that an electronic apparatus transmitting an unauthenticated distribution request is connected to the network, when the determiner 130 determines that the number of distribution requests received by the request receiver 122 exceeds the number specified by the number specification information corresponding to the distribution target group, that is, the number of ECUs 20 belonging to the distribution target group.

The error output unit 140 is capable of outputting an error signal to, for example, a maintenance tool connected to the GW 10 via the external input/output terminal of the GW 10 or the in-vehicle network system 1. Specifically, when the GW 10 distributes a pre-shared key in a state where a maintenance tool used by a maintenance worker is connected with the GW 10 before the vehicle V is shipped or the like, the error output unit 140 outputs the error signal to the maintenance tool. Based on the error signal input from the error output unit 140, the maintenance tool displays an error message indicating that an electronic apparatus transmitting an unauthenticated distribution request is connected to the network. This structure prompts the maintenance worker who uses the maintenance tool to properly cope with the situation.

The error output unit 140 may also output the predetermined data corresponding to the distribution target group to the maintenance tool, together with the error signal indicating that an electronic apparatus transmitting an unauthenticated distribution request is connected to the network. In such a case, the maintenance tool displays the predetermined data corresponding to the distribution target group, or information generated based on the predetermined data, together with the error message described above. This structure enables the maintenance worker who uses the maintenance tool to check which group of the ECUs 20 in the in-vehicle network system 1 has trouble with sharing of the pre-shared key.

The error output unit 140 may also output information of the transmission source included in the distribution request received by the request receiver 122, together with the error signal indicating that an ECU 20 transmitting an unauthenticated distribution request is connected to the network. In such a case, the maintenance tool displays the information of the transmission source of the distribution request, together with the error message described above. This structure enables the maintenance worker who uses the maintenance tool to specify the electronic apparatus that has transmitted the unauthenticated distribution request.

The error output unit 140 may output the error signal described above to a display panel or a warning indicator provided in the vehicle V. Specifically, even after shipment of the vehicle V, there are cases where the GW 10 distributes a pre-shared key periodically or in accordance with a predetermined instruction, for example, for the purpose of updating the pre-shared key. In such a case, because it is supposed that no maintenance tool described above is connected with the GW 10, the error output unit 140 outputs the error signal described above to a display panel or a warning indicator provided in the vehicle V. The display provided in the vehicle V displays an error message indicating that an electronic apparatus transmitting an unauthenticated distribution request is connected to the network, based on the error signal input from the error output unit 140. The warning indicator turns on or blinks the light source, based on the error signal input from the error output unit 140. This structure prompts, for example, the driver of the vehicle V to properly cope with the situation.

When the determiner 130 determines that the number of distribution requests received by the request receiver 122 does not exceed the number specified by the number specification information corresponding to the distribution target group, that is, the number of ECUs 20 belonging to the distribution target group, the calculator 150 performs various calculations necessary for distribution of the pre-shared key to the ECUs 20. Specifically, the calculator 150 decrypts the encrypted temporal key included in the distribution request received by the request receiver 122 using the private key corresponding to the public key of the GW 10. The calculator 150 also encrypts the pre-shared key to be transmitted to each of the ECUs 20 using the temporal key. The pre-shared key encrypted by the calculator 150 is transmitted by the key transmitter 123 to the ECU 20. In the case of using data selected at random or according to predetermined rules as the pre-shared key, the calculator 150 generates the pre-shared key.

Figure 5:
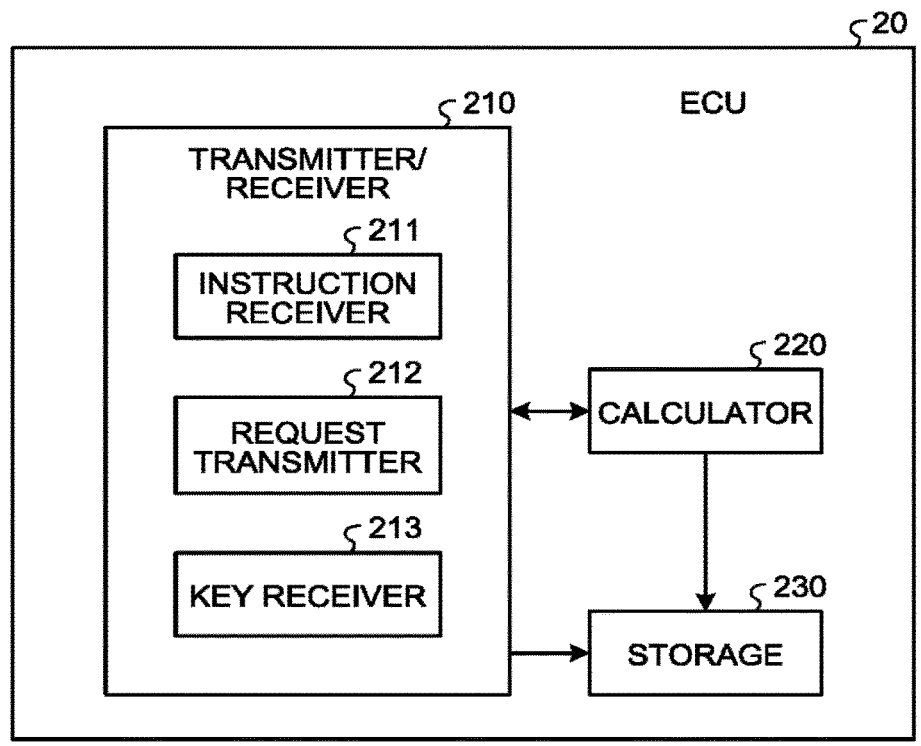
FIG. 5 is a block diagram illustrating a functional configuration example of an ECU according to the first embodiment.

The following is an explanation of the outline of each ECU 20 according to the present embodiment. FIG. 5 is a block diagram illustrating a functional configuration example of each ECU 20 according to the present embodiment. For example, as illustrated in FIG. 5, each ECU 20 according to the present embodiment includes a transmitter/receiver 210, a calculator 220, and a storage 230, as functional constituent elements relating to acquisition of the pre-shared key.

The transmitter/receiver 210 is a module with which the ECU 20 communicates with the GW 10 through the network. The transmitter/receiver 210 includes an instruction receiver 211, a request transmitter 212, and a key receiver 213, as submodules.

When the predetermined data included in a sharing start instruction transmitted from the instruction transmitter 121 of the GW 10 corresponds to the group to which the ECU 20 belongs, the instruction receiver 211 receives the sharing start instruction. For example, when the predetermined data included in the sharing start instruction is a control signal, the instruction receiver 211 receives the sharing start instruction including the control signal when the control signal is a control signal to be transmitted and received between the ECU 20 and another ECU 20. In addition, when the predetermined data included in the sharing start instruction is a group ID, the instruction receiver 211 receives the sharing start instruction including the group ID when the group ID is the group ID assigned to the group to which the ECU 20 belongs. When the predetermined data stored in the sharing start instruction is a set of apparatus IDs, the instruction receiver 211 receives the sharing start instruction including the set of apparatus IDs when the set of apparatus IDs includes the apparatus ID assigned to the ECU 20.

The instruction receiver 211 receives the public key and the public key certificate of the GW 10 transmitted from the instruction transmitter 121 of the GW 10 together with the sharing start instruction, and stores the public key of the GW 10 in the storage 230, after checking that validity of the GW 10 is guaranteed by the public key certificate.

When the instruction receiver 211 receives a sharing start instruction, the request transmitter 212 transmits a distribution request including a temporal key generated by the calculator 220 and encrypted with the public key of the GW 10 to the GW 10 via the network.

The key receiver 213 receives the encrypted pre-shared key transmitted from the key transmitter 123 of the GW 10. When the key transmitter 123 of the GW 10 transmits the inspection data described above together with the encrypted pre-shared key, the key receiver 213 also receives the inspection data together with the encrypted pre-shared key.

The calculator 220 performs various calculations necessary for acquisition of the pre-shared key. Specifically, when the instruction receiver 211 receives a sharing start instruction, the calculator 220 generates a temporal key and stores the temporal key in the storage 230. The calculator 220 also encrypts the generated temporal key using the public key of the GW 10. The encrypted temporal key is transmitted by the request transmitter 212 to the GW 10 as a distribution request. When the key receiver 213 receives an encrypted pre-shared key, the calculator 220 decrypts the encrypted pre-shared key using the temporal key stored in the storage 230, to store the acquired pre-shared key in the storage 230. When the key receiver 213 receives inspection data together with the encrypted pre-shared key, the calculator 220 inspects validity of the pre-shared key using the inspection data, and stores the pre-shared key, validity of which has been verified, in the storage 230.

The storage 230 stores therein the public key of the GW 10 received by the instruction receiver 211, the temporal key generated by the calculator 220, and the pre-shared key decrypted by the calculator 220, and the like. The temporal key generated by the calculator 220 may be deleted after the pre-shared key is decrypted.

The following is an operation example of the GW 10 and each ECU 20 relating to distribution of the pre-shared key according to the present embodiment, with reference to FIG. 6. FIG. 6 is a flowchart illustrating an example of processing procedures according to the present embodiment. A series of processing procedures illustrated in the flowchart of FIG. 6 is repeatedly performed for each distribution target group.

When the processing is started, first, the determiner 130 of the GW 10 sets the counter to 0 (Step S101). Next, the instruction transmitter 121 of the GW 10 transmits a sharing start instruction including predetermined data corresponding to the distribution target group onto the network together with the public key of the GW 10 (Step S102).

The instruction receiver 211 of each ECU 20 belonging to the distribution target group receives the sharing start instruction and the public key of the GW 10 transmitted from the instruction transmitter 121 of the GW 10 (Step S201). Thereafter, the calculator 220 of each ECU 20 that has received the sharing start instruction and the public key of the GW 10 generates a temporal key (Step S202), and encrypts the temporal key using the public key of the GW 10 (Step S203). Thereafter, the request transmitter 212 of each ECU 20 transmits a distribution request including the encrypted temporal key to the GW 10 (Step S204).

The request receiver 122 of the GW 10 receives the distribution request transmitted from the request transmitter 212 of each ECU 20 (Step S103). When the request receiver 122 receives a distribution request, the determiner 130 of the GW 10 increments the counter (Step S104). Thereafter, the determiner 130 determines whether a predetermined time has passed since the instruction transmitter 121 transmitted the sharing start instruction (Step S105). When no predetermined time has passed (No at Step S105), the determiner 130 returns to Step S103, to wait for reception of the next distribution request.

By contrast, when predetermined time has passed since the instruction transmitter 121 transmitted the sharing start instruction (Yes at Step S105), the determiner 130 determines whether a counter value obtained by counting the number of received distribution requests exceeds the number specified by the number specification information corresponding to the distribution target group, that is, the number of ECUs 20 belonging to the distribution target group (Step S106). When the determiner 130 determines that the counter value exceeds the number of ECUs 20 belonging to the distribution target group (Yes at Step S106), the error output unit 140 of the GW 10 outputs an error signal indicating that an electronic apparatus transmitting an unauthorized distribution request is connected to the network (Step S107).

By contrast, when the determiner 130 determines that the counter value does not exceed the number of ECUs 20 belonging to the distribution target group (No at Step S106), the calculator 150 of the GW 10 decrypts the encrypted temporal key included in the distribution request using the private key corresponding to the public key of the GW 10 (Step S108), and encrypts the pre-shared key using the temporal key (Step S109). The key transmitter 123 of the GW 10 transmits the encrypted pre-shared key to the ECU 20 as a response to the distribution request (Step S110).

The key receiver 213 of the ECU 20 receives the encrypted pre-shared key transmitted from the key transmitter 123 of the GW 10 (Step S205). When the key receiver 213 receives the encrypted pre-shared key, the calculator 220 of the ECU 20 decrypts the encrypted pre-shared key using the temporal key (Step S206), and stores the acquired pre-shared key in the storage 230 (Step S207).

In the example described above, the determiner 130 of the GW 10 determines whether the counter value obtained by counting the number of received distribution requests exceeds the number of ECUs 20 belonging to the distribution target group, when the predetermined time has passed since transmission of the sharing start instruction. Thereafter, when the counter value obtained by counting the number of received distribution requests does not exceed the number of ECUs 20 belonging to the distribution target group, the key transmitter 123 of the GW 10 transmits the pre-shared key encrypted using the temporal key generated by the ECU 20 to the ECU 20, as a response to the distribution request. However, the embodiment may have a structure in which determination made by the determiner 130 of the GW 10 and transmission of the encrypted pre-shared key by the key transmitter 123 are performed whenever the request receiver 122 receives a distribution request from the ECU 20, and the error output unit 140 outputs an error signal, when the counter value obtained by counting the number of received distribution requests exceeds the number of ECUs 20 belonging to the distribution target group, to stop the operation of the in-vehicle network system 1 and invalidate the pre-shared key that has already been transmitted.

As explained in detail above with specific examples, in the in-vehicle network system 1 according to the present embodiment, the GW 10 receives distribution requests transmitted from the ECUs 20 in response to the sharing start instruction, and determines whether the number of received distribution requests exceeds the number of ECUs 20 belonging to the distribution target group. When the number of received distribution requests exceeds the number of ECUs 20 belonging to the distribution target group, the GW 10 outputs an error signal indicating that an electronic apparatus that transmits an unauthenticated distribution request is connected to the network. As described above, the present embodiment enables detecting an attempt of another electronic apparatus to improperly acquire a pre-shared key to be shared between the ECUs 20 that perform communications, and prompts the maintenance worker or the driver of the vehicle V, for example, to properly cope with the situation.

In addition, the GW 10 is configured to transmit a pre-shared key to each of the ECUs 20 belonging to the distribution target group in response to the distribution request, when the number of received distribution requests does not exceed the number of ECUs 20 belonging to the distribution target group. Accordingly, even when an unauthenticated electronic apparatus is connected to the network, the present embodiment enables the ECUs 20 that perform communications to properly share the pre-shared key, and guarantees validity of communications between the ECUs 20 by authentication using the pre-shared key.

Modification

In the first embodiment described above, the public key of the GW 10 is used to encrypt the temporal key generated by each ECU 20, and the encrypted temporal key is decrypted using the private key corresponding to the public key of the GW 10. However, instead of the public key and the private key, a cryptographic key shared between the GW 10 and each ECU 20 may be used to encrypt and decrypt the temporal key generated by the ECU 20. For example, in the case where the GW 10 updates the pre-shared key distributed to each ECU 20 periodically or according to predetermined instructions, the temporal key generated by each ECU 20 can be encrypted and decrypted using the pre-shared key distributed by the GW 10 to the ECU 20 in the past. In addition, when a shared cryptographic key is embedded in advance in both the GW 10 and the ECU 20, the cryptographic key may be used to encrypt and decrypt the temporal key generated by the ECU 20.

The first embodiment described above illustrates an example in which the GW 10 distributes a pre-shared key used for derivation of the MAC value to each of the ECUs 20, but the data distributed by the GW 10 to the ECUs 20 is not limited to the pre-shared key used for derivation of the MAC value, but may be any data to be shared between the ECUs 20 belonging to the same group. For example, the present embodiment may be applied to the case of distributing a session key derived from the pre-shared key, or the case of distributing data for generating a session key from the pre-shared key. The present embodiment may also be applied to the case of distributing data to be shared other than a cryptographic key.

Second Embodiment

A second embodiment will be explained hereinafter. The second embodiment is different from the first embodiment described above in that each of the ECUs 20 connected to the network as nodes of the in-vehicle network system 1 is equipped with a physically unclonable function (PUF) outputting data peculiar to the apparatus, and the pre-shared key is calculated using a PUF output serving as data peculiar to the apparatus. The PUF output is data peculiar to the ECU 20. A pre-shared key can be generated from the PUF output, by using data (hereinafter referred to as "helper data") adjusted to absorb difference in PUF output between the ECUs 20. In the present embodiment, the helper data is distributed to the ECUs 20, instead of the pre-shared key distributed by the GW 10 to the ECUs 20 in the first embodiment. In the following description, constituent elements common to the first and the second embodiments will be denoted by the same reference numerals, to properly omit overlapping explanation, and only parts characteristic to the present embodiment will be explained. In the following description, the GW 10 of the present embodiment is expressed as "GW 10'" to be distinguished from that of the first embodiment, and the ECU 20 of the present embodiment is expressed as "ECU 20'" to be distinguished from that of the first embodiment.

FIG. 7 illustrates a block diagram illustrating a functional configuration example of the GW 10' according to the present embodiment. For example, as illustrated in FIG. 7, the GW 10' of the present embodiment includes the storage 110, a transmitter/receiver 120', the determiner 130, the error output unit 140, and a calculator 150', as functional constituent elements relating to distribution of the pre-shared key. Among them, the storage 110, the determiner 130, and the error output unit 140 are equal to those in the first embodiment, and explanation thereof is omitted.

The transmitter/receiver 120' is a module with which the GW 10' communicates with each ECU 20' through the network, and includes the instruction transmitter 121, a request receiver 122', and a helper data transmitter 124, as submodules. Among them, the instruction transmitter 121 is equal to that in the first embodiment, and explanation thereof is omitted.

The request receiver 122' receives a distribution request transmitted from each ECU 20' in response to the sharing start instruction transmitted from the instruction transmitter 121. The distribution request includes a PUF output encrypted using the public key of the GW 10'. The PUF output itself encrypted using the public key of the GW 10' may be used as a distribution request. The PUF output is data that is output from a PUF mounted on each ECU 20', and peculiar data peculiar to the ECU 20'. In the present embodiment, a pre-shared key is derived in each ECU 20' from helper data generated by the GW 10' and the PUF output. Specifically, the GW 10' calculates helper data for deriving a pre-shared key from the PUF output serving as data peculiar to the ECU 20', and transmits the helper data to the ECU 20'. The ECU 20' derives a pre-shared key from the PUF output of the ECU 20' itself using the helper data received from the GW 10'. The encrypted PUF output included in a distribution request is decrypted using a private key corresponding to the public key of the GW 10'.

When the determiner 130 determines that the number of distribution requests received by the request receiver 122' does not exceed the number specified by the number specification information corresponding to the distribution target group, that is, the number of ECUs 20' belonging to the distribution target group, the helper data transmitter 124 transmits helper data for deriving a pre-shared key shared between the ECUs 20' belonging to the distribution target group to each ECU 20' that has transmitted a distribution request.

To each ECU 20' that has transmitted a distribution request, the helper data transmitter 124 transmits helper data calculated using the PUF output of the ECU 20'. For example, the helper data transmitter 124 specifies the ECU 20' to which helper data is to be transmitted, based on information of the transmission source included in the distribution request received by the request receiver 122'. Thereafter, the helper data transmitter 124 transmits helper data for deriving a pre-shared key from the PUF output of the specified ECU 20' to the specified ECU 20' serving as the destination.

The helper data transmitter 124 may broadcast each of pieces of helper data to be transmitted to the respective ECUs 20' onto the network. In such a case, the helper data transmitter 124 also transmits inspection data for inspecting validity of the pre-shared key to be derived using the helper data. The inspection data may be a hash value of the pre-shared key, or a value obtained by encrypting a predetermined value stored in both the GW 10' and the ECU 20' with the pre-shared key. When a hash value of the pre-shared key as the inspection data, each ECU 20' is capable of inspecting validity of the pre-shared key, by calculating a hash value of the pre-shared key derived from the received helper data and the PUF output, and determining whether the calculated hash value agrees with the hash value transmitted from the GW 10'. When a value obtained by encrypting the predetermined value using the pre-shared key is used as the inspection data, each ECU 20' is capable of inspecting validity of the pre-shared key, by encrypting the predetermined value using the pre-shared key derived from the received helper data and the PUF output, and determining whether the obtained value agrees with the value transmitted from the GW 10'.

When the determiner 130 determines that the number of distribution requests received by the request receiver 122' does not exceed the number specified by the number specification information corresponding to the distribution target group, that is, the number of ECUs 20' belonging to the distribution target group, the calculator 150' performs various calculations necessary for transmission of helper data to each ECU 20'. Specifically, the calculator 150' decrypts the encrypted PUF output included in a distribution request received by the request receiver 122' using a private key corresponding to the public key of the GW 10'. The calculator 150' also calculates helper data for deriving the pre-shared key from the PUF output, based on the PUF output of the ECU 20' and the pre-shared key to be shared between the ECUs 20'. The helper data calculated by the calculator 150' is transmitted by the helper data transmitter 124 to the ECU 20'. In the case of using data selected at random or according to predetermined rules as the pre-shared key, the calculator 150' generates the pre-shared key.

The following is an explanation of an outline of each ECU 20' according to the present embodiment. FIG. 8 is a block diagram illustrating a functional configuration example of each ECU 20' according to the present embodiment. For example, as illustrated in FIG. 8, each ECU 20' according to the present embodiment includes a transmitter/receiver 210', a calculator 220', a storage 230', and a PUF 240, as functional constituent elements relating to acquisition of helper data.

The transmitter/receiver 210' is a module with which the ECU 20' communicates with the GW 10' through the network. The transmitter/receiver 210' includes the instruction receiver 211, a request transmitter 212', and a helper data receiver 214, as submodules. Among them, the instruction receiver 211 is equal to that of the first embodiment, and explanation thereof is omitted.

When the instruction receiver 211 receives a sharing start instruction, the request transmitter 212' transmits a distribution request including a PUF output encrypted using the public key of the GW 10' to the GW 10' via the network. The PUF output is peculiar data of the ECU 20' that is output from the PUF 240. The PUF output is encrypted by the calculator 220' using the public key of the GW 10'. The encrypted PUF output is transmitted as a distribution request from the request transmitter 212' to the GW 10'.

The helper data receiver 214 receives the helper data transmitted from the helper data transmitter 124 of the GW 10'. When the helper data transmitter 124 of the GW 10' transmits the inspection data described above together with the helper data, the helper data receiver 214 also receives the inspection data together with the helper data.

The calculator 220' performs various calculations necessary for acquisition of helper data. Specifically, when the instruction receiver 211 receives a sharing start instruction, the calculator 220' acquires a PUF output from the PUF 240, and encrypts the PUF output using the public key of the GW 10'. The encrypted PUF output is transmitted by the request transmitter 212' to the GW 10' as a distribution request. When the helper data receiver 214 receives helper data, the calculator 220' stores the helper data in the storage 230'. When the helper data receiver 214 receives inspection data together with helper data, the calculator 220' inspects validity of the pre-shared key using the inspection data, and stores the helper data received by the helper data receiver 214 in the storage 230, when validity of the pre-shared key is verified.

When the ECU 20' requires the pre-shared key, that is, when the ECU 20' communicates with another ECU 20' belonging to the same group, the calculator 220' acquires a PUF output from the PUF 240 and reads out helper data from the storage 230', to derive the pre-shared key based on the PUF output and the helper data.

The storage 230' stores therein the public key of the GW 10' received by the instruction receiver 211, and helper data received by the helper data receiver 214.

The following is an explanation of an operation example of the GW 10' and each ECU 20' according to the present embodiment, with reference to FIG. 9. FIG. 9 is a flowchart illustrating an example of processing procedures according to the present embodiment. A series of processing procedures illustrated in the flowchart of FIG. 9 is repeatedly performed for each distribution target group.

When the processing is started, first, the determiner 130 of the GW 10' sets the counter to 0 (Step S301). Next, the instruction transmitter 121 of the GW 10' transmits a sharing start instruction including predetermined data corresponding to the distribution target group onto the network together with the public key of the GW 10' (Step S302).

The instruction receiver 211 of each ECU 20' belonging to the distribution target group receives the sharing start instruction and the public key of the GW 10' transmitted from the instruction transmitter 121 of the GW 10' (Step S401). Thereafter, the calculator 220' of each ECU 20' that has received the sharing start instruction and the public key of the GW 10' acquires a PUF output from the PUF 240 (Step S402), and encrypts the PUF output using the public key of the GW 10' (Step S403). Thereafter, the request transmitter 212' of each ECU 20' transmits a distribution request including the encrypted PUF output to the GW 10' (Step S404).

The request receiver 122' of the GW 10' receives the distribution request transmitted from the request transmitter 212' of the ECU 20' (Step S303). When the request receiver 122' receives a distribution request, the determiner 130 of the GW 10' increments the counter (Step S304). Thereafter, the determiner 130 determines whether a predetermined time has passed since the instruction transmitter 121 transmitted the sharing start instruction (Step S305). When no predetermined time has passed (No at Step S305), the determiner 130 returns to Step S303, to wait for reception of the next distribution request.

By contrast, when predetermined time has passed since the instruction transmitter 121 transmitted the sharing start instruction (Yes at Step S305), the determiner 130 determines whether a counter value obtained by counting the number of received distribution requests exceeds the number specified by the number specification information corresponding to the distribution target group, that is, the number of ECUs 20' belonging to the distribution target group (Step S306). When the determiner 130 determines that the counter value exceeds the number of ECUs 20' belonging to the distribution target group (Yes at Step S306), the error output unit 140 of the GW 10' outputs an error signal indicating that an electronic apparatus transmitting an unauthorized distribution request is connected to the network (Step S307).

By contrast, when the determiner 130 determines that the counter value does not exceed the number of ECUs 20' belonging to the distribution target group (No at Step S306), the calculator 150' of the GW 10' decrypts the encrypted PUF output included in the distribution request using the private key corresponding to the public key of the GW 10' (Step S308). Thereafter, the calculator 150' calculates helper data for deriving the pre-shared key from the PUF output, based on the decrypted PUF output and the pre-shared key to be shared between the ECU 20' (Step S309). The helper data transmitter 124 of the GW 10' transmits the helper data calculated by the calculator 150' to the ECU 20' as a response to the distribution request (Step S310).

The helper data receiver 214 of the ECU 20' receives the helper data transmitted from the helper data transmitter 124 of the GW 10' (Step S405). When the helper data receiver 214 receives the helper data, the calculator 220' of the ECU 20' stores the helper data in the storage 230' (Step S406).

In the same manner as the first embodiment, the present embodiment may also have a structure in which determination made by the determiner 130 of the GW 10' and transmission of helper data by the helper data transmitter 124 are performed whenever the request receiver 122' receives a distribution request from the ECU 20', and the error output unit 140 outputs an error signal, when the counter value obtained by counting the number of received distribution requests exceeds the number of ECUs 20' belonging to the distribution target group, to stop the operation of the in-vehicle network system 1 and invalidate the helper data that has already been transmitted.

As explained in detail above with specific examples, the in-vehicle network system 1 according to the present embodiment, the GW 10' receives distribution requests transmitted from the ECUs 20' in response to the sharing start instruction, and determines whether the number of received distribution requests exceeds the number of ECUs 20' belonging to the distribution target group. When the number of received distribution requests exceeds the number of ECUs 20' belonging to the distribution target group, the GW 10' outputs an error signal indicating that an electronic apparatus that transmits an unauthenticated distribution request is connected to the network. As described above, the present embodiment enables detecting an attempt of another electronic apparatus to improperly acquire a pre-shared key to be shared between the ECUs 20' that perform communications, and prompts the maintenance worker or the driver of the vehicle V, for example, to properly cope with the situation.

In addition, the GW 10' is configured to transmit helper data for deriving a pre-shared key from a PUF output to each of the ECUs 20' belonging to the distribution target group in response to the distribution request, when the number of received distribution requests does not exceed the number of ECUs 20' belonging to the distribution target group. Accordingly, even when an unauthenticated electronic apparatus is connected to the network, the present embodiment enables the ECUs 20' that perform communications to properly share the pre-shared key, and guarantees validity of communications between the ECUs 20' by authentication using the pre-shared key.

In particular, the present embodiment has the structure in which the GW 10' does not store the pre-shared key itself, but stores helper data for deriving the pre-shared key from the PUF output. This structure reduces the risk of leakage of the pre-shared key due to malicious attack on the ECUs 20', and achieves securer in-vehicle network system 1.

Modification

In the second embodiment described above, the public key of the GW 10' is used to encrypt the PUF output of each ECU 20', and the encrypted PUF output is decrypted using the private key corresponding to the public key of the GW 10'. However, instead of the public key and the private key, a cryptographic key shared between the GW 10' and each ECU 20' may be used to encrypt and decrypt the PUF output of the ECU 20'. For example, in the case where the pre-shared key of the ECU 20' is updated periodically or according to predetermined rules, the PUF output of each ECU 20' can be encrypted and decrypted using the past pre-shared key. In addition, when a shared cryptographic key is embedded in advance in both the GW 10' and the ECU 20', the cryptographic key may be used to encrypt and decrypt the PUF output of the ECU 20'.

Supplementary Explanation

The functions of the GW 10 and 10' described above can be achieved by, for example, cooperation of the hardware illustrated in FIG. 2 and software. In such a case, the functional constituent elements are achieved by control performed by the microcontroller 12 in accordance with a program provided as software, while the microcontroller 12 uses the network I/F 11.

The program that achieves the functional constituent elements of the GW 10 and 10' is provided in a state of being incorporated in advance in a memory area of the microcontroller 12 or the like. The program may be provided in a state of being recorded on a computer-readable recording medium, which may be provided as a computer program product, such as a CD-ROM, a flexible disk (FD), a CD-R, and a DVD. The program may also be stored in a computer connected to a network such as the Internet, to be provided by download through the network. The program may be configured to be provided or distributed through a network such as the Internet. Part of or all the functional constituent elements of the GW 10 and 10' described above may be achieved using dedicated hardware such as an ASIC and an FPGA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data distribution apparatus connected with a plurality of electronic apparatuses through a network, the data distribution apparatus comprising a network interface and a microcontroller for performing control and execution of:
    a storage configured to store group management information in which predetermined data corresponding to a group is associated with number specification information for specifying number of electronic apparatuses belonging to the group;
    an instruction transmitter configured to transmit a sharing start instruction including the predetermined data;
    a request receiver configured to receive one or more distribution requests transmitted from one or more electronic apparatuses in response to the sharing start instruction; and
    an error output unit configured to output an error signal indicating that an electronic apparatus transmitting an unauthorized distribution request is connected to the network when the number of received distribution requests exceeds the number specified by the number specification information;

a helper data transmitter configured to transmit helper data to derive a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including peculiar data peculiar to each of the electronic apparatuses, the helper data transmitter transmits the helper data calculated from the peculiar data and the shared key to the electronic apparatuses, the instruction transmitter transmits a public key of the data distribution apparatus together with the sharing start instruction, the request receiver receives the distribution requests including the peculiar data encrypted with the public key, and the helper data transmitter transmits the helper data calculated from the peculiar data decrypted with a private key corresponding to the public key and the shared key to the electronic apparatuses.

2. The apparatus according to claim 1, further comprising a key transmitter configured to transmit a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including a temporal key generated by the electronic apparatuses, and the key transmitter transmits the shared key encrypted with the temporal key to the electronic apparatuses.

3. The apparatus according to claim 2, wherein the instruction transmitter transmits a public key of the data distribution apparatus together with the sharing start instruction, the request receiver receives the distribution requests including the temporal key encrypted with the public key, and the key transmitter transmits the shared key encrypted with the temporal key decrypted with a private key corresponding to the public key to the electronic apparatuses.

4. The apparatus according to claim 2, wherein the request receiver receives the distribution requests including the temporal key encrypted with a shared key shared previously, and the key transmitter transmits a new shared key encrypted with the temporal key decrypted with the shared key shared previously to the electronic apparatuses.

5. The apparatus according to claim 1, wherein the request receiver receives the distribution requests including the peculiar data encrypted with a shared key shared previously, and the helper data transmitter transmits the helper data calculated from the peculiar data decrypted with the shared key shared previously and a new shared key to the electronic apparatuses.

6. The apparatus according to claim 1, wherein the predetermined data is a control signal transmitted and received between the electronic apparatuses belonging to a corresponding group.

7. The apparatus according to claim 1, wherein the predetermined data is group identification information assigned to a corresponding group.

8. The apparatus according to claim 1, wherein the predetermined data is a set of pieces of electronic apparatus identification information assigned to the respective electronic apparatuses belonging to a corresponding group.

9. A communication system comprising:

a data distribution apparatus connected with a plurality of electronic apparatuses through a network, the data distribution apparatus comprising a network interface and a microcontroller for performing control and execution of:

a storage configured to store group management information in which predetermined data corresponding to a group is associated with number specification information for specifying number of electronic apparatuses belonging to the group;

an instruction transmitter configured to transmit a sharing start instruction including the predetermined data;

a request receiver configured to receive one or more distribution requests transmitted from one or more electronic apparatuses in response to the sharing start instruction; and an error output unit configured to output an error signal indicating that an electronic apparatus transmitting an unauthorized distribution request is connected to the network when the number of received distribution requests exceeds the number specified by the number specification information;

a helper data transmitter configured to transmit helper data to derive a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including peculiar data peculiar to each of the electronic apparatuses, the helper data transmitter transmits the helper data calculated from the peculiar data and the shared key to the electronic apparatuses, the instruction transmitter transmits a public key of the data distribution apparatus together with the sharing start instruction, the request receiver receives the distribution requests including the peculiar data encrypted with the public key, and the helper data transmitter transmits the helper data calculated from the peculiar data decrypted with a private key corresponding to the public key and the shared key to the electronic apparatuses; and a plurality of electronic apparatuses connected with the data distribution apparatus through a network.

10. A moving object comprising a communication system comprising:

a data distribution apparatus connected with a plurality of electronic apparatuses through a network, the data distribution apparatus comprising a network interface and a microcontroller for performing control and execution of:

a storage configured to store group management information in which predetermined data corresponding to a group is associated with number specification information for specifying number of electronic apparatuses belonging to the group;

an instruction transmitter configured to transmit a sharing start instruction including the predetermined data;

a request receiver configured to receive one or more distribution requests transmitted from one or more electronic apparatuses in response to the sharing start instruction; and an error output unit configured to output an error signal indicating that an electronic apparatus transmitting an unauthorized distribution request is connected to the network when the number of received distribution requests exceeds the number specified by the number specification information;

a helper data transmitter configured to transmit helper data to derive a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including peculiar data peculiar to each of the electronic apparatuses, the helper data transmitter transmits the helper data calculated from the peculiar data and the shared key to the electronic apparatuses, the instruction transmitter transmits a public key of the data distribution apparatus together with the sharing start instruction, the request receiver receives the distribution requests including the peculiar data encrypted with the public key, and the helper data transmitter transmits the helper data calculated from the peculiar data decrypted with a private key corresponding to the public key and the shared key to the electronic apparatuses; and a plurality of electronic apparatuses connected with the data distribution apparatus through a network.

11. A data distribution method performed by a data distribution apparatus connected with a plurality of electronic apparatuses through a network, the data distribution apparatus including a storage configured to store group management information in which predetermined data corresponding to a group is associated with number specification information for specifying number of electronic apparatuses belonging to the group, the method comprising:

transmitting a sharing start instruction including the predetermined data;

receiving one or more distribution requests transmitted from one or more electronic apparatuses in response to the sharing start instruction; and outputting an error indicating that an electronic apparatus transmitting an unauthorized distribution request is connected to the network, when the number of received distribution requests exceeds the number specified by the number specification information;

transmitting helper data to derive a shared key to be shared between the electronic apparatuses belonging to the group to the electronic apparatuses, as a response to the received distribution requests, when the number of received distribution requests does not exceed the number specified by the number specification information, wherein the receiving receives the distribution requests including peculiar data peculiar to each of the electronic apparatuses, the transmitting the helper data transmits the helper data calculated from the peculiar data and the shared key to the electronic apparatuses, the transmitting the instruction transmits a public key of the data distribution apparatus together with the sharing start instruction, the receiving receives the distribution requests including the peculiar data encrypted with the public key, and the transmitting the helper data transmits the helper data calculated from the peculiar data decrypted with a private key corresponding to the public key and the shared key to the electronic apparatuses.

12. A data distribution apparatus connected with a plurality of electronic apparatuses through a network, the data distribution apparatus comprising a network interface and a microcontroller for performing control and execution of:

a storage configured to store group management information in which predetermined data corresponding to a group is associated with number specification information for specifying number of electronic apparatuses belonging to the group;

an instruction transmitter configured to transmit a sharing start instruction including the predetermined data;

a request receiver configured to receive one or more distribution requests transmitted from one or more electronic apparatuses in response to the sharing start instruction;

an error output unit configured to output an error signal indicating that an electronic apparatus transmitting an unauthorized distribution request is connected to the network when the number of received distribution requests exceeds the number specified by the number specification information, a helper data transmitter configured to transmit helper data to derive a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including peculiar data peculiar to each of the electronic apparatuses, and the helper data transmitter transmits the helper data calculated from the peculiar data and the shared key to the electronic apparatuses, the request receiver receives the distribution requests including the peculiar data encrypted with a shared key shared previously, and the helper data transmitter transmits the helper data calculated from the peculiar data decrypted with the shared key shared previously and a new shared key to the electronic apparatuses.

13. The apparatus according to claim 12, further comprising a key transmitter configured to transmit a shared key to be shared between the electronic apparatuses belonging to the group to the electronic apparatuses, as a response to the received distribution requests, when the number of received distribution requests does not exceed the number specified by the number specification information, wherein the request receiver receives the distribution requests including a temporal key generated by the electronic apparatuses, and the key transmitter transmits the shared key encrypted with the temporal key to the electronic apparatuses.

14. The apparatus according to claim 13, wherein
the instruction transmitter transmits a public key of the data distribution apparatus together with the sharing start instruction,
the request receiver receives the distribution requests including the temporal key encrypted with the public key, and
the key transmitter transmits the shared key encrypted with the temporal key decrypted with a private key corresponding to the public key to the electronic apparatuses.

15. The apparatus according to claim 13, wherein
the request receiver receives the distribution requests including the temporal key encrypted with a shared key shared previously, and
the key transmitter transmits a new shared key encrypted with the temporal key decrypted with the shared key shared previously to the electronic apparatuses.

16. The apparatus according to claim 12, wherein the predetermined data is a control signal transmitted and received between the electronic apparatuses belonging to a corresponding group.

17. The apparatus according to claim 12, wherein the predetermined data is group identification information assigned to a corresponding group.

18. The apparatus according to claim 12, wherein the predetermined data is a set of pieces of electronic apparatus identification information assigned to the respective electronic apparatuses belonging to a corresponding group.

19. A communication system comprising:
the data distribution apparatus according to claim 12; and
a plurality of electronic apparatuses connected with the data distribution apparatus through a network.

20. A moving object equipped with the communication system according to claim 19.

21. A data distribution method performed by a data distribution apparatus connected with a plurality of electronic apparatuses through a network, the data distribution apparatus including a storage configured to store group management information in which predetermined data corresponding to a group is associated with number specification information for specifying number of electronic apparatuses belonging to the group, the method comprising:
transmitting a sharing start instruction including the predetermined data;
receiving one or more distribution requests transmitted from one or more electronic apparatuses in response to the sharing start instruction;
outputting an error indicating that an electronic apparatus transmitting an unauthorized distribution request is connected to the network, when the number of received distribution requests exceeds the number specified by the number specification information,
transmitting a helper data to derive a shared key to be shared between the electronic apparatuses belonging to the group to the electronic apparatuses, as a response to the received distribution requests, when the number of received distribution requests does not exceed the number specified by the number specification information, wherein
the receiving receives the distribution requests including peculiar data peculiar to each of the electronic apparatuses, and
the transmitting the helper data transmits the helper data calculated from the peculiar data and the shared key to the electronic apparatuses,
the receiving receives the distribution requests including the peculiar data encrypted with a shared key shared previously, and
the transmitting the helper data transmits the helper data calculated from the peculiar data decrypted with the shared key shared previously and a new shared key to the electronic apparatuses.

* * * * *